United States Patent
Paolini

(10) Patent No.: US 8,021,021 B2
(45) Date of Patent: Sep. 20, 2011

(54) AUTHORING, RECORDING, AND REPLICATION OF LIGHTING

(75) Inventor: Steven Paolini, Saratoga, CA (US)

(73) Assignee: Telelumen, LLC, Saratoga, CA (US)

(*) Notice: Subject to any disclaimer, the term of this patent is extended or adjusted under 35 U.S.C. 154(b) by 479 days.

(21) Appl. No.: 12/215,463

(22) Filed: Jun. 26, 2008

(65) Prior Publication Data

US 2009/0323321 A1 Dec. 31, 2009

(51) Int. Cl.
*F21V 33/00* (2006.01)

(52) U.S. Cl. .................. 362/253; 362/227; 362/249.01; 362/249.02; 362/800

(58) Field of Classification Search .................. 362/227, 362/231, 234, 249.01–249.02, 253, 800
See application file for complete search history.

(56) References Cited

U.S. PATENT DOCUMENTS

| | | | |
|---|---|---|---|
| 6,525,855 B1 | 2/2003 | Westbrook et al. |
| 6,683,423 B2 | 1/2004 | Cunningham |
| 6,890,085 B2 | 5/2005 | Hacker |
| 6,965,205 B2 | 11/2005 | Piepgras et al. |
| 7,023,543 B2 | 4/2006 | Cunningham |
| 7,046,160 B2 | 5/2006 | Pederson et al. |
| 7,119,498 B2 | 10/2006 | Baldwin et al. |
| 7,125,143 B2 | 10/2006 | Hacker |
| 7,178,941 B2 | 2/2007 | Roberge et al. |
| 7,202,613 B2 | 4/2007 | Morgan et al. |
| 7,221,104 B2 | 5/2007 | Lys et al. |
| 7,227,634 B2 | 6/2007 | Cunningham |
| 2003/0107887 A1 | 6/2003 | Eberl |
| 2004/0105261 A1 | 6/2004 | Ducharme et al. |
| 2004/0218387 A1 | 11/2004 | Gerlach |
| 2005/0046850 A1* | 3/2005 | Chow ........................... 356/430 |
| 2006/0006820 A1 | 1/2006 | Roseman et al. |
| 2006/0176693 A1 | 8/2006 | Walter et al. |
| 2007/0174773 A1 | 7/2007 | Abernethy, Jr. et al. |

FOREIGN PATENT DOCUMENTS

| | | |
|---|---|---|
| EP | 1750428 A2 | 7/2007 |
| EP | 1876385 A2 | 9/2008 |
| GB | 2409287 A | 6/2005 |
| WO | WO01/06316 A1 | 1/2001 |

OTHER PUBLICATIONS

Won, Euntae, Samsung Electronics"SG VLC Project Draft 5C", IEEEP802.15 15-08-0667-01-0vlc, Sep. 2008, pp. 1-3.

* cited by examiner

*Primary Examiner* — Stephen F Husar
*Assistant Examiner* — Meghan K Dunwiddie
(74) *Attorney, Agent, or Firm* — David T. Millers

(57) ABSTRACT

Systems and methods permit use of efficient solid state emitters for broad spectrum continuous spectrum lighting defined by illumination data. The illumination data, which can be sold as a commercial product, can be recorded or authored and include spectral, temporal, and spatial information. Intensities of individual emitters such as LEDs can be controlled through a combination of pulse width modulation (PWM) and amplitude modulation (AM) of drive currents. The combination of PWM and AM permits fine tuning of the spectrum of emissions and creation of free space optical data channels.

25 Claims, 3 Drawing Sheets

AUTHORING, RECORDING, AND REPLICATION OF LIGHTING

BACKGROUND

The portion of the electromagnetic spectrum with wavelengths between about 350 nm and 750 nm, which includes visible light, is useful for many purposes. For example, these wavelengths enable human vision and photosynthesis by providing enough energy to do useful work in biological systems but not so much energy as to destroy the biological systems. The sun produces vast amounts of radiation in this spectral range and the earth's atmosphere allows transmission of these wavelengths to the surface. Other natural light sources such as fire and lightning as well as man-made sources such as incandescent, fluorescent, and solid state lighting also produce electromagnetic radiation or light in this spectral range.

Lighting from the sun is arguably the "gold standard" of illumination since humans are adapted to live in solar illumination. For the sun, the quantity of light varies with time from darkness to blinding. The sun has both intense collimated light from a small area (the solar disk) and subdued diffuse light from a large area (blue sky). The spectral distribution, location, and direction of light from the sun also change in a relatively consistent way as the sun moves across the sky. These solar lighting patterns affect many biological processes such as the human wake-sleep cycle and plant and animal lifecycles, which are often influenced by solar patterns.

The dynamic variation in illumination from man-made light sources is generally much smaller than the dynamic variation in the illumination from the sun. In the cases of candles, incandescent bulbs, fluorescent tubes, and discharge lamps, the spectrum and to a large degree the amount of light provided are fixed at the time of installation. Some dimming and spectral change are possible over a limited range, but illumination from the vast majority of these lighting systems is static. In addition, where dimming or spectral modifications are possible, the dimming often decreases the energy efficiency of the light source, and spectral modifications, which are conventionally achieved with optical filters, can be very wasteful of energy. Other light qualities like location, direction, and beam divergence are also fixed in most installations. However, the value of human vision is so great that this static, inflexible illumination is acceptable in many cases.

Lighting systems and methods are desired that provide greater flexibility and dynamic qualities.

SUMMARY

In accordance with an aspect of the invention, lighting systems and methods improve several aspects of light quality over conventional approaches. In particular, illumination data can define continuous broad spectrum lighting that can be produced using a player and luminaires containing multiple solid state emitters such as LEDs. The illumination data, which may be recorded from an existing natural or manmade lighting environment or authored, can include spectral, temporal, and spatial information defining the qualities of the light produced. The intensities of individual emitters in the luminaires can be controlled through a combination of pulse width modulation (PWM) and amplitude modulation (AM) of drive currents. The combination of PWM and AM permits fine tuning of the spectrum of emissions and creation of free space optical data channels.

In accordance with one specific embodiment of the invention, a process produces illumination data to represent a desirable spectral distribution and uses the illumination data to control operation of a light source containing multiple emitters such as LEDs with different peak wavelength emissions. In particular, the light source operates the emitters so that respective intensities of light from the emitters are determined from the illumination data and a combination of the respective intensities of the emitters produces the desired spectral distribution. The illumination data can be produced by a variety of techniques ranging from recording the illumination characteristics in a specific environment to authoring the illumination data from scratch to achieve a desired function or aesthetic effect.

In accordance with another specific embodiment of the invention, a system includes one or more light sources and a player connected to the light source or sources. Each light source includes multiple emitters such as LEDs with each of the emitters having an emission spectrum that differs from the emission spectra of the other emitters. The player is connected to independently control the intensity of light emitted from each of the emitters. The player is further capable of accessing illumination data representing a spectral distribution and uses illumination data to determine respective intensities of emissions from the emitters required to produce the illumination represented by the illumination data.

In accordance with yet another embodiment of the invention, a business method includes creating illumination data that represents information including the spectral distribution of a desired illumination. The illumination data can be sold in a file format that can be played through a lighting system to reproduce the desired illumination.

BRIEF DESCRIPTION OF THE DRAWINGS

Use of the same reference symbols in different figures indicates similar or identical items.

DETAILED DESCRIPTION

The emergence of solid state light sources, most notably LEDs (light emitting diodes) has provided much longer lasting, more robust, and more energy-efficient alternatives to conventional vacuum and combustible light sources. However, while most conventional light sources are broad spectrum (e.g., white light) emitters, LEDs are generally narrow spectrum emitters that intrinsically produce colored light with a relatively narrow distribution of wavelengths. Since white light is often preferred, LED systems using a blue LED and yellow phosphor have been developed that appear white. However, the light from conventional LED systems is generally less than ideal for many lighting applications. In accordance with an aspect of the present invention, multiple LEDs with different colors or emission peaks can be combined to produce illumination with a desired spectrum, rather than simply providing the appearance of a specific color such as white.

Figure 1:
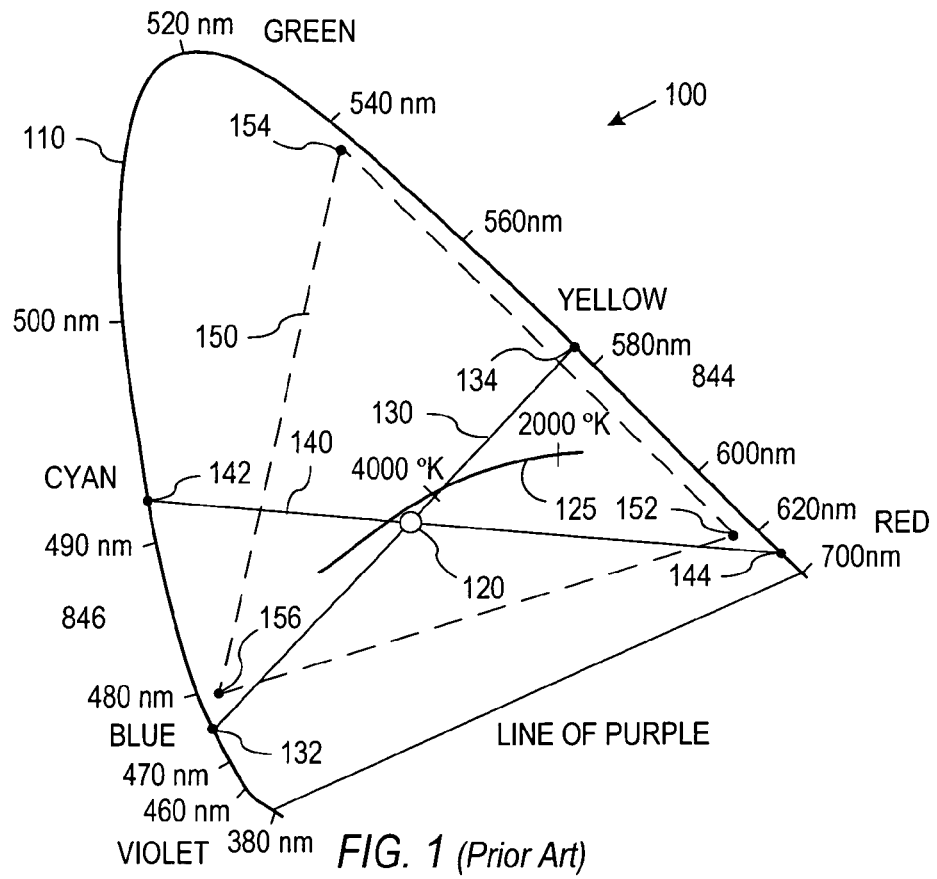
FIG. 1 is a chromaticity diagram illustrating the apparent color of light sources containing a few narrow band emitters.

The apparent color of a light source can be roughly determined using a chromaticity diagram such as an International Commission on Illumination (CIE) chromaticity diagram 100 as shown in FIG. 1. Chromaticity diagram 100 has a border 110 that corresponds to spectral colors in the visible spectrum, i.e., monochromatic light with wavelengths between about 380 nm and about 700 nm. Points inside border 110 in chromaticity diagram 100 correspond to colors perceived by the human eye in response to combinations of spectral colors. In particular, a point or region 120 corresponds to the color white, which can be produced using many different combinations of spectral colors. For example, white light can be produced by a black body that is heated to the correct temperature. In FIG. 1, a curve 125 represents the apparent color of blackbody radiation over a range of temperatures of an ideal blackbody. As is well known, a blackbody begins to glow with a reddish color at about 1500° K, changes through orange and yellow as the temperature of the blackbody rises, and appears whitish at temperatures between about 4000 and 6000° K. Incandescent lights generally produce light that appears white through electrical heating of a filament, and the light from an incandescent bulb can be similar to blackbody radiation.

The spectrum of blackbody radiation is a continuous spectrum, but the appearance of white can also be achieved using just two spectral colors. In particular, if a line connecting two points in chromaticity diagram 100 passes through the region 120 corresponding to white, two light sources with colors corresponding to those points when combined with the proper intensity ratio appear white. FIG. 1 specifically illustrates that a line 130 connecting points 132 and 134 respectively corresponding to spectral colors blue and yellow passes through region 120, and a combination of the blue and yellow light will appear white if the ratio of the intensities of the two colors corresponds to a point in region 120. A line 140 also crosses region 120 showing that other colors, e.g., cyan (point 142) and red (point 144) could alternatively be used to generate the appearance of white. However, a two color system is not very flexible as a light source. In particular, a two color light system can only produce the appearance of colors on lines connecting the corresponding points in a chromaticity diagram. Further, illumination using two color sources cannot provide the full spectral content of a natural light source such as the sun, and therefore the lighting suffers the problem of metamerism, as described further below.

Producing the sensation of a range of colors, for example, for a color video display, generally requires illumination with at least three colors. Most commonly the three colors are red, green, and blue, for example, points 152, 154, and 156 in chromaticity diagram 100. Varying the ratios of the intensity of these primary colors can generate any color (including white) within a triangle 150 having points 152, 154, and 156 as vertices as shown on diagram 100. Most video displays (TV, computer, stadium screen, etc.) use variation of the relative intensities of red, green, and blue light to produce the sensation of a relatively full range of colors. The sensation of different colors can be achieved because human eyes normally have three types of cones, and the respective cones are most sensitive to red, green, and blue light. Since LEDs can be made in red, green, and blue, LED displays using three colors can produce color changeable or static colored light for displays, accent, or illumination.

While a three primary color system does a good job of creating the sensation of many colors, such a system does not come close to accurately representing the continuous spectrum and specific spectral power distributions of broad spectrum sources such as the sun, fire, or an incandescent bulb. Accordingly, a three primary color system is not completely satisfactory as a source of illumination, particularly for objects with significant reflectance in between or beyond the three primary colors emitted. Differences in an illumination spectrum generally can change the appearance of objects, and most people would prefer sunlight or at least continuous spectrum sources to look at an object for the best viewing of color. Another benefit of continuous spectrum sources, particularly the sun, over illumination using three primary colors is the presence of short wavelength light that can cause fluorescence in the objects illuminated. The fluorescence helps give sparkle to objects that can otherwise look dull under poor lighting.

As previously alluded, a situation known as metamerism exists where two objects with different spectral characteristics look the same under illumination by one light source but not under illumination by another light source. This situation can sometimes be avoided or remedied by tailoring the spectral characteristics of an object during manufacturing or by limiting the spectral characteristics of the lighting of the object. However, these options are often not available or produce sub-optimal results, and an observer can be left frustrated that objects appear to have different colors in different lighting. An example of this occurs when a customer buys black pants and an apparently black blazer in a store with fluorescent lighting only to find later that the blazer is actually navy blue when viewed in sunlight.

Broad spectrum lighting may have benefits in addition to improving the apparent color of objects. Cones, which are eye cells that resolve colors, occupy an important but small region of the human eye, but the eye also contain rods that extend over a larger portion of the retina. The rods are important for peripheral vision and vision in low lighting. Rods have a scotopic curve that peaks at a light wavelength of about 507 nm. Human eyes also have sensors that are in a layer of ganglion cells that cover most of the inside surface of the eye. These sensors can sense non-visual information and are believed to be responsible for the regulation of various bodily functions such as the sleep/wake cycle and hormone production. The peak sensitivity for these cells occur about 480 nm, which is between blue and green and roughly the color of blue sky. The wavelengths of peak sensitivities of these cells are not normally an important region of the spectrum emitted by traditional LED lighting. Fixtures that produce light in the correct spectral regions can thus have biological benefits and improve vision under lower lighting conditions. A programmable, continuous spectrum light source can address these and other conditions that are important for a given situation.

Figure 2:
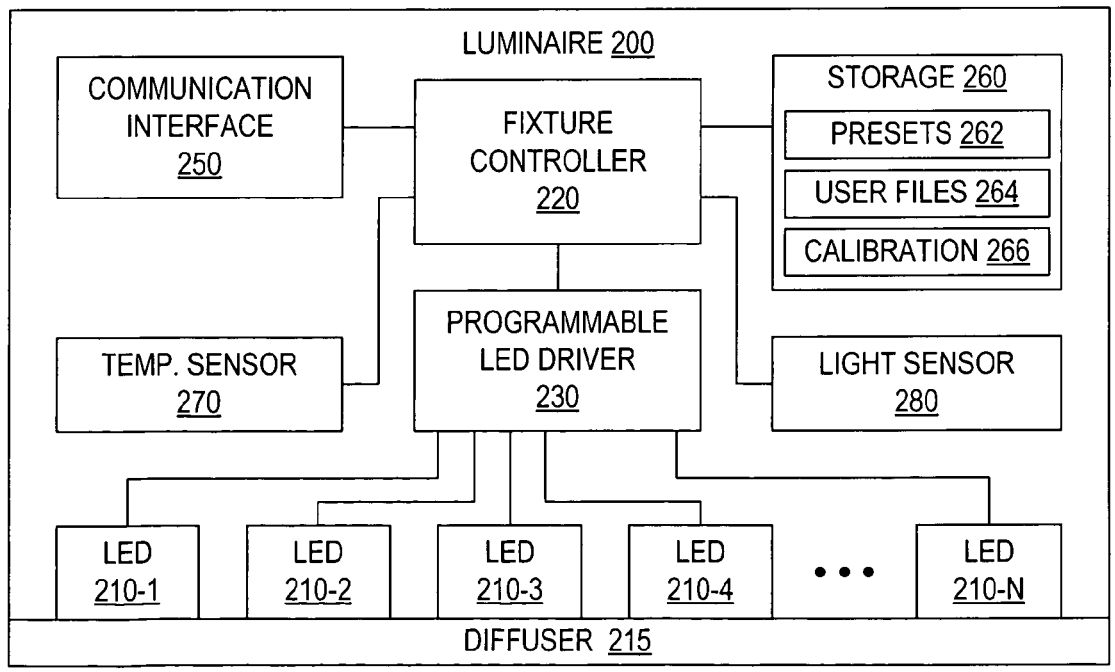
FIG. 2 shows a luminaire in accordance with an embodiment of the invention using narrow band light sources to provide illumination having a broad wavelength range.

The color anomalies and failure of lighting to provide light having wavelengths corresponding to peak sensitivities of specific biological systems can be virtually eliminated through use of many narrow spectrum sources that collectively provide illumination that continuously covers an extended portion of the visible spectrum or beyond. FIG. 2 illustrates a luminaire 200 in accordance with an embodiment of the invention containing multiple types of LEDs 210-1 to 210-N. The different types of LEDs 210-1 to 210-N have different emission spectra and collectively can be configured and operated to produce a recorded or authored spectral distribution over a broad range of wavelengths, e.g., a range that covers most of the visible spectrum and that may extend to ultraviolet or infrared wavelengths. The number N of types of LEDs 210-1 to 210-N required to cover the desired range of wavelengths generally depends on the range and the widths of the emitted spectra of LEDs 210-1 to 210-N. In an exemplary embodiment, LEDs 210-1 to 210-N have different colors (e.g., from 5 to 50 different colors) with peak emission wavelengths in a range from about 400 nm to about 700 nm, and the peak emission wavelengths of LEDs 210-1 to 210-N can be separated by steps of about 5 nm to about 50 nm to continuously cover the visible spectrum when individual LED spectra have FWHM of about 15 to 35 nm. A diffuser 215, which is an optical device such as a frosted plate of a transparent material, can be used to mix light from the LEDs 210-1 to 210-N to provide more spatially uniform lighting that combines light from all LEDs 210-1 to 210-N. Additionally, LEDs 210-1 to 210-N of the same type can be scattered in different locations within an array of LEDs 210-1 to 210-N for better spatial uniformity of the spectrum of emitted light.

LEDs having different peak emission wavelengths can be produced using different materials or structures and would normally be provided on separate chips. However, the part of the spectrum between about 540 nm and 590 nm is inefficient for direct emission from current LEDs because this wavelength range is near the extremes of the two dominant LED material systems, InGaN (540 nm) and AlInGaP (590 nm). Phosphors (not shown) can be added to one or more LEDs 210-1 to 210-N to convert direct LED emissions to the desired wavelengths through fluorescence. A disadvantage to the phosphor conversion when compared to direct LED emissions is degraded spectral resolution. LED phosphor emissions generally have much broader spectral profiles than do the direct emissions from an LED, and the emitted spectrum from the LED-phosphor combination may contain an emission peak corresponding to fluorescence and a second peak from the intrinsic emitted wavelength of the LED. These effects could limit the ability to tune the overall spectrum of light emitted from luminaire 200. Even so, phosphor converted LEDs are likely to have an important role in continuous-spectrum products.

A consequence of using LEDs of wavelengths across the visible spectrum may be a loss of energy efficiency because current LED technology produces light of some wavelengths less efficiently. The number of LEDs of each type (i.e., having the same or very similar peak emission wavelengths) may differ to enable a more uniform maximum intensity across the spectrum. For example, the number of LEDs of a specific type in luminaire 200 may be selected, so that the LEDs of each type have the same combined maximum intensity. Use of less efficient LEDs reduces overall energy efficiency of luminaire 200 but may be unavoidable when accuracy of the final spectrum is the priority. Alternatively, more LEDs of the most energy efficient type or types can be included in luminaire 200 for use when energy efficiency is preferred over spectral accuracy, for example, for outdoor lights that are on much of the time. Luminaire 200 may also employ light sources that have broader spectra in addition to or in place of LEDs with narrow spectra that cover the same range of wavelengths. In particular, when the available LEDs are less efficient at producing light with specific wavelengths, luminaire 200 can include LEDs with phosphors that fluoresce to produce light with the wavelengths that are less efficiently produced by direct emission from LEDs. The broad spectrum sources may be used when spectral resolution is less important than energy efficacy.

Figure 3A:
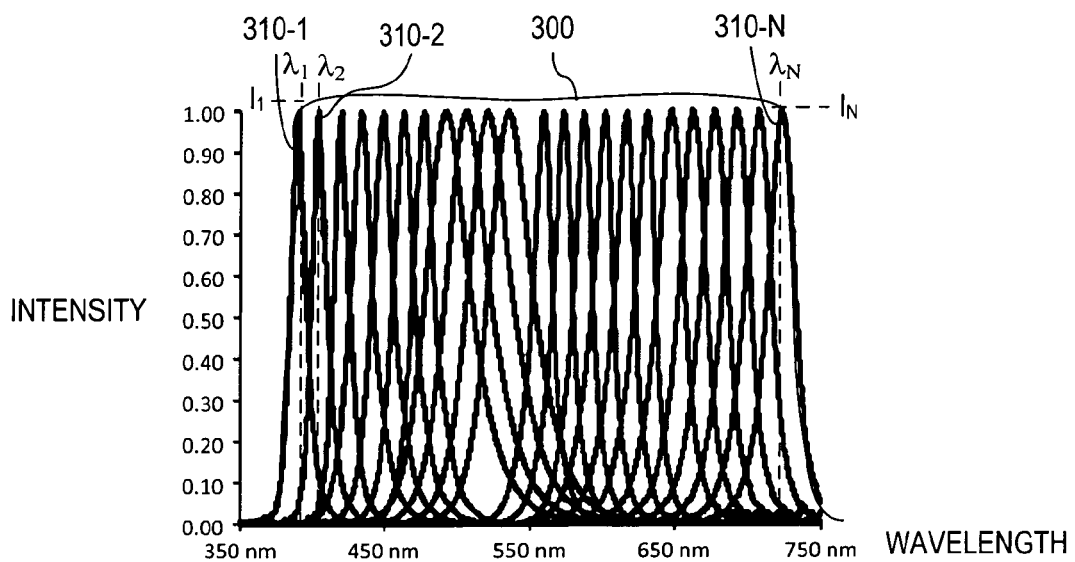
FIG. 3A shows a programmable spectral distribution from a light source in accordance with an embodiment of the invention.
Figure 3B:
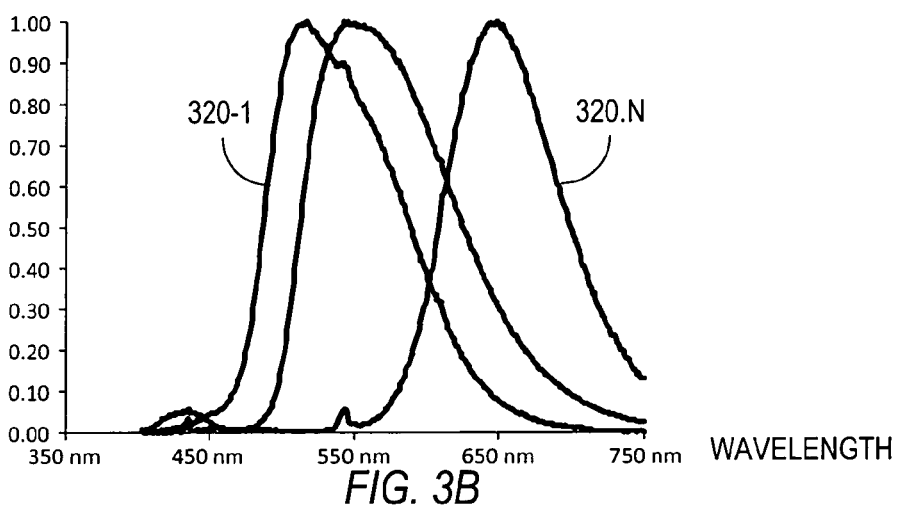
FIG. 3B shows the spectra of phosphor converted LEDs that can be used with the spectra of direct LED emissions to produce a programmable spectral distribution.

In addition to LEDs 210-1 to 210-N, luminaire 200 contains a fixture controller 220 that operates a programmable LED 230 driver to individually adjust the intensity of light emitted from each of LEDs 210-1 to 210-N. In particular, the intensities emitted from LEDs 210-1 to 210-N can be adjusted to provide lighting that approximates any desired spectral power distribution over the range of wavelengths of LEDs 210-1 to 210-N. FIG. 3A illustrates an example of a spectral distribution 300 that is the sum of narrow band distributions 310-1 to 310-N respectively having characteristic peak wavelengths $\lambda_1$ to $\lambda_N$ of respective LEDs 210-1 to 210-N. The illustrated spectral distribution 300 corresponds to white light having roughly equal intensities of light for all wavelengths between about 350 nm and 750 nm. However, peak intensities s $I_1$ to $I_N$ of narrow band spectral distributions 310-1 to 310-N for LEDs 210-1 to 210-N have magnitudes under the control of driver 230 of FIG. 2. Fixture 200 can thus reproduce a desired spectrum by separately adjusting each of intensities $I_1$ to $I_N$. The accuracy with which a spectral distribution can be reproduced generally depends on the number of different peak wavelengths $\lambda_1$ to $\lambda_N$, the widths of the emission spectra of the types of LEDs 210-1 to 210-N, and the dynamic range of intensity of each of LEDs 210-1 to 210-N. To optimize spectral accuracy, a large number of (e.g., on the order of 20 to 50) types of LEDs 210-1 to 210-N are desired with each type having a different wavelength for peak emissions. The widths of the emission spectra of each type should be as narrow as possible while still overlapping with the emission spectra of other LEDs 210-1 to 210-N of other types. However, light sources of phosphor converted LEDs which have wider distributions, such as the spectral distributions 320-1 to 320-N shown in FIG. 3B, can be used when the accuracy of the reproduced spectrum is less important or when light sources having wider spectrum are more efficient at producing light with a desired wavelength.

Driver 230 can generally dim each of LEDs 210-1 to 210-N to almost any desired extent by pulse width modulation (PWM) and/or amplitude modulation (AM) of the respective drive currents of the LEDs 210-1 to 210-N. In one embodiment of the invention, independent drive currents respectively control the intensities of LEDs 210-1 to 210-N, and LED driver 230 modulates the amplitudes of the drive currents to the LEDs 210-1 to 210-N and alters the on-time of the drive currents for both PWM and AM control. The use of both PWM and AM has advantages over just using one or the other. In particular, a desired overall dynamic range of illumination intensity for luminaire 200 may be 100,000:1 or greater. A range of AM between 10:1 and 1000:1 would thus be desirable. If AM is not used in control of drive currents in luminaire 200, a large magnitude current would be needed to achieve the desired maximum lumens, and dimming can only be accomplished with shorter pulses of drive current. Operating at near darkness illuminations then requires short pulses with fast edges, generating more noise (EMI) which has to be abated in some way. Further, the efficiency of an LED is often inversely proportional to the drive current, and use of short high current pulses does not provide maximum energy efficiency. This is particularly true of the InGaN materials used for short to mid wavelengths and phosphor converted white. For example, a reduction by a factor of 10 in the drive current to an InGaN-based LED can result in a 70% increase in efficiency. Energy lost as heat (or $I^2R$ losses) in driver 230 and wiring also goes up as the drive current goes up. The ability to adjust the magnitude of the drive current can avoid these problems with using PWM alone, and combining AM and PWM may also provide a way of tuning the emission spectrum of each LED 210-1 to 210-N because the peak emission wavelength of an LED often has at least some correlation to the amplitude of the drive current.

Uses of PWM or AM are not limited to static and relatively slow lighting effects. LEDs can be turned on and off very rapidly, much faster than the eye or even many machines could detect. The rapid switching speed of LEDs 210-1 to 210-N could be exploited to transmit data and in many cases at the same time as static or average illumination is being used for other purposes. Further with the multiplicity of different wavelength sources, each LED 210-1 to 210-N could operate for transmission of a separate data channel, which could greatly increase the available data bandwidth.

Luminaire 200 of FIG. 2 used as described above can accurately reproduce or approximate the spectral and brightness characteristics of many different light sources or produce lighting according to a pattern created by an author or engineer. In one embodiment of the invention, luminaire 200 uses illumination data to define specific illumination that luminaire 200 produces. The illumination data can be input into luminaire 200 through a communication interface 250 or stored in a storage system 260. In an exemplary embodiment, communication interface 250 connects luminaire 200 to a network that may include similar luminaires or control devices and can further be part of a user interface that allows a user to control luminaire 200, for example, to select active illumination data for operation of luminaire 200. Storage system 260 in luminaire 200 can be used to store illumination data and executable code for fixture controller 220 and may be any type of system capable of storing information. Such systems include but are not limited to volatile or non-volatile IC memory such as DRAM or Flash memory and readers for removable media such as magnetic disks, optical disks, or Flash drives.

FIG. 2 illustrates storage 260 as containing two types of illumination data including presets 262 and user files 264. Presets 262 are factory installed illumination data files that represent default lighting or lighting that would be useful to a wide number of users. The presets might include, for example, the spectra of common natural light source such as the sun at noon on a cloudless summer day or a full moon, the spectra of flame based light sources such as candles or a camp fire, the spectra of common electrical light sources such as incandescent or fluorescent lights, and the spectra that provide luminaire 200 with optimal energy efficiency for human vision over a range of different intensities. User files 264 are illumination data that a user has chosen to store in luminaire 200. User files 264 can include illumination data of the same types as mentioned for the presets but additionally include illumination data that are of particular interest for a specific user. For example, an individual may load into storage 260 illumination data that provides light having spectral content and time variation that is optimized for their sleep cycle or the sleep cycle of their child. A researcher may load into storage 260 illumination data that create lighting that provides the desired spectral content for an experiment or lighting that optimizes the growth of particular plants or organisms.

There are many different types of lighting that can be represented by illumination data files that can be stored as presets or user data in storage 260. To list a few examples, luminaire 200 can reproduce or approximate the spectrum of light from a natural source such as the sun or the moon as it would appear on specific days, times, and locations. Illumination data can represent light with a spectrum mimicking a conventional manmade light source such as an incandescent light of any of a variety of types, a fluorescent light, a gas flame, a candle, an oil lamp, a kerosene lantern, an arc-lamp, or a limelight, or represent light with a spectrum having a specific utility such as a black light, a bug light, a film-safe light, a grow lamp, or colored light corresponding to any desired filter effect. All of these different types of lighting which may be represented by illumination data can be reproduced by luminaire 200. Luminaire 200 can also produce light having a spectrum of a light source that does not normally exist such as 5000° K halogen light, which cannot be easily made because the filament would melt. Also, as mentioned above, the illumination data can be tailored for luminaire 200 to provide optimal energy efficiency, for example, to change the shape of the spectrum of luminaire 200 with brightness level for best human vision or other useful purpose per amount of energy consumed.

Illumination data could have a variety of different file formats suitable for representing the desired lighting information. A static spectral distribution, for example, may be simply represented using a set of samples corresponding to a set of different wavelengths of light. Alternatively, a static spectral distribution could be represented by the coefficients of a particular transform, e.g., Fourier transform, of the spectral distribution. Further information in the illumination data could represent how the spectral distribution changes with time or absolute intensity. The illumination data could further include positional or directional information to indicate spatial variations in the spectrum and intensity of lighting, particularly when luminaire 200 is used with other similar lighting fixtures to illuminate a room or other environment.

Fixture controller 220 decodes the illumination data that a user selects for operation of luminaire 200 and programs driver 230 as needed to cause LEDs 210-1 to 210-N to produce the lighting called for in the illumination data. In general, fixture controller 220 can employ data from multiple sources in order to determine the correct programming of driver 230. For example, fixture controller 220 can interpolate between samples provided in the active illumination data when the peak wavelengths emitted from LEDs 210-1 to 210-N differ from wavelengths represented in the selected illumination data. Calibration data 266, which may be factory set in storage system 260, can indicate the peak emitted wavelengths respectively measured from LEDs 210-1 to 210-N as well as other LED performance data such as emission intensity dependence on drive current, temperature, or other factors. For each LED, fixture controller 220 can then use calibration data 266 and temperature data from a temperature sensor 270 to determine the drive signal needed for that LED to produce the required contribution to the spectral distribution represented in the selected illumination data. A light sensor 280 can be employed to monitor the emitted light from LEDs 210-1 to 210-N to allow fixture controller 220 to adapt the calculation of the required drive signals according to changes in performance that occur as luminaire 200 ages or is used.

Luminaire 200, which can produce virtually any illumination spectral power distributions within the power limits of the LEDs 210-1 to 210-N, can be used with other similar luminaires to produce desired spatial pattern in lighting. The spatial pattern of the lighting may be subject to temporal variations in the same way the spectral content may vary. For example, lighting that reproduces the path of solar illumination from dawn to dusk would include spatial, spectral, and intensity variations over the course of a day. A system implementing desired spatial, spectral, and intensity patterns for lighting could be employed, for example, in scene lighting or home lighting.

Figure 4:
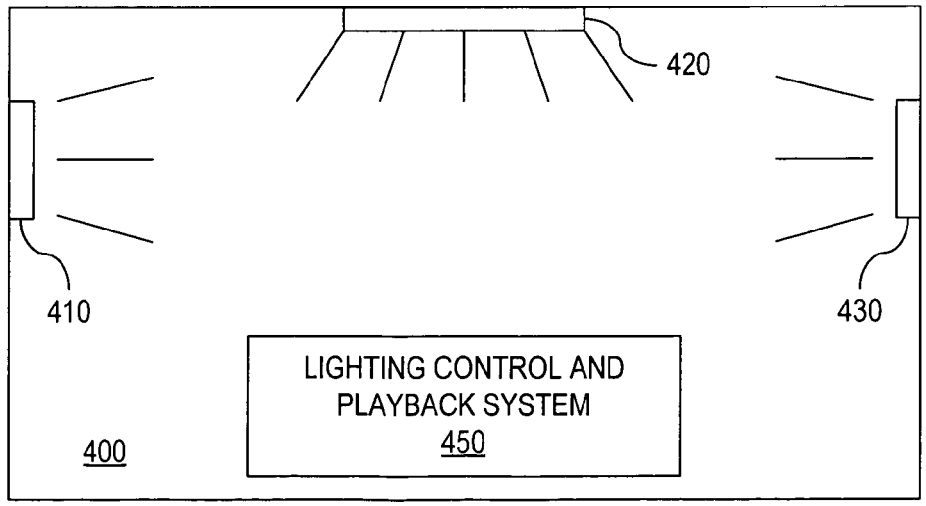
FIG. 4 illustrates a system in accordance with an embodiment of the invention for illuminating a room.

FIG. 4 illustrates a room 400 containing a lighting system in accordance with an embodiment of the invention providing lighting with spatial variations. Room 400 includes multiple light sources 410, 420, and 430. Each light source 410, 420, or 430 can be a flexible luminaire such as luminaire 200 of FIG. 2 and therefore be capable of producing light having a programmable spectral profile. A lighting control or player system 450 is in communication with light sources 410, 420, and 430 and may be a separate unit as illustrated in FIG. 4 or may be physically incorporated in one or more of luminaires 410, 420, and 430. Player system 450 can include specially designed hardware or a general purpose computer executing software to implement the desired lighting functions.

Luminaires 410, 420, and 430 can act as a network under control of player system 450 to provide room lighting with the desired spectral, temporal, and spatial distribution. A variety of physical and logical arrangements of multiple luminaires 410, 420, and 430 are possible. For example, each luminaire 410, 420, and 430 could have a network address, all luminaires 410, 420, and 430 could be connected in a serial fashion, or luminaires 410, 420, and 430 could be configured and addressed in rows and columns to provide an area with overhead lighting. Preferably, the configuration used allows player system 450 independent communications with each luminaire 410, 420, or 430.

During setup or operation of lighting in room 400, player system 450 can poll the characteristics of each particular luminaire 410, 420, or 430 to determine light source characteristics, which may include static and dynamic information. The static information could, for example, include the positions of luminaires 410, 420, and 430 and the number of colors and type of emitters in each of luminaires 410, 420, and 430. The dynamic information can include the temperatures, ages, and number of luminaires 410, 420, and 430. Player system 450 can further include sensors capable of measuring the spectral distribution of light at one or more points in room 400. Based on the measured light or the determined characteristics of luminaires 410, 420, and 430 and the selected illumination data, player system 450 selects spectral distributions for respective luminaires 410, 420, and 430, and player system 450 or luminaires 410, 420, and 430 can calculate the drive currents of the emitters in luminaires 410, 420, and 430 needed to produce the desired lighting in room 400.

Player system 450 is capable of executing complex lighting programs that include specific spectral and spatial distributions and time variations of the spectral and spatial lighting in room 400. For example, the spatial and spectral information in an illumination data file could mimic large scale illumination sources, such as the sky, from content specifically recorded for playback in lighting systems. Lighting in room 400 could thus reproduce the spectral distribution of diffuse lighting from the sky recorded from a specific location and time of the day and year. Further, lighting in room 400 could additionally mimic time variations in the spectral distribution of the sky over a day or season in real time or at a compressed or extended time scale. A bright localized lighting associated with the sun could be super imposed over the sky light program. Player system 450 could alternatively be switched to reproduce lighting in room 400 that mimics the flickering and spectral characteristics of a camp fire or candle light, the light from incandescent bulbs, or even a lightning strike. More generally, player system 450 can be operated to produce any lighting that may be represented in an illumination data file recorded or authored for that purpose.

Figure 5:
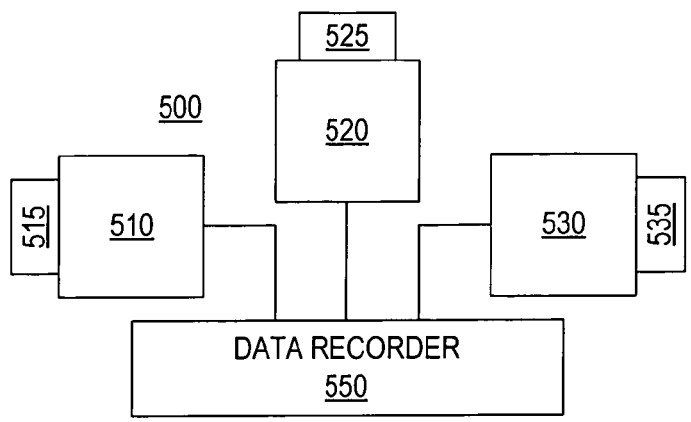
FIG. 5 illustrates a system in accordance with an embodiment of the invention for recording illumination data.

In accordance with a further aspect of the invention, a recorder system can be employed to capture the spectral, temporal, and directional characteristics of an existing lighting environment for reproduction in the lighting system of FIG. 2 or 4. FIG. 5 illustrates a simple recording system 500 that can record lighting patterns for playback in room 400 of FIG. 4. Recording system 500 includes multiple "camcorders" 510, 520, and 530 that are pointed in different directions. For example, camcorder 520 can be pointed directly up at the sky, while camcorders 510 and 530 are pointed in selected compass directions and at angles to vertical. The orientations of camcorders 510 to 530 could alternatively be selected according to the locations of luminaires in a specific lighting system, such as lighting system 400 of FIG. 4. Conventional color camcorders have only three channels (red, green, and blue), which is generally inadequate for full spectral recording desired here. Accordingly, each camcorder 510, 520, and 530 is preferably a black-and-white camcorder in which each pixel sensor is sensitive to light within a broad spectrum. Camcorders 510, 520, and 530 can be respectively equipped with collimator and prisms, diffraction gratings, or other optical elements 515, 525, and 535 that spatially separate light having different wavelengths. As a result, a given region of the spectrum, for example, light with wavelengths from 350 nm to 750 nm, is spread out over the surface of the sensor array in each camcorder 510, 520, or 530. Once pixel sensors in the camcorder are correlated to the angles over which different wavelengths of light are spread, the amount of light of a particular wavelength can be read directly from the intensity measured by the pixel sensor or sensors at a position corresponding to that wavelength.

A data recorder 550 such as a computer with software or a hardwired system can determine intensities in a set of wavelength bands and store the measured intensities in an illumination data file format that retains associated spectral, time, and spatial information. The frame rate employed for such recording in general will depend on the time scale of the lighting effect recorded. For example, a very low frame rate, e.g., less than about once per minute, may be suitable for recording a day long evolution of outdoor lighting, although a faster frame rate, e.g., 10 frames per second could be employed at sunrise or sunset or to record the lighting while a storm coming. On the other hand, lightning can travel at 60 km/s, so a capture rate of 1000 frames per second may be needed for a high fidelity recording of the illumination from a lightning strike.

Instead of black-and-white camcorders with color filters, hyperspectral cameras could be used for recording the spectral and spatial evolution of lighting. Hyperspectral cameras essentially have a spectrometer at each pixel and often have many fewer pixels than do video or digital still cameras. Hyperspectral cameras are well-known and used in applications such as remote sensing of the earth for military and environmental purposes and industrial process control. Hyperspectral cameras have the drawbacks of being expensive and generating large amounts of data, which may not be required to record lighting with suitable fidelity.

Processing of raw illumination data can make the illumination data more useful or interesting as input to a lighting system and allow convenient interaction by lighting designers, artists, and researchers. For example, in many cases, the original lighting information, such as a day of sunlight, changes very slowly, and the slow variation in lighting allows significant compression without loss of useful information. It may also be desirable to manipulate or combine recorded scenes. For example, a recording of a single candle flame could be overlaid multiple times to produce the appearance of multiple independent candles, or the intensity and spectral distribution of the candle flame can be altered to mimic the natural candle's correlated change in color temperature or to hold color temperature constant and only change the intensity. Other examples of alterations include morphing different independently recorded lighting patterns smoothly into others to form a new unique lighting pattern. Light from a sunny day could, for example, transition toward rain, then lightning. These transitions could include spectral, spatial, and temporal information.

Another aspect of the processing of the raw files would be to transform spatial or spectral information from the original recording to the actual positions and capabilities of the lights in a room. Lights would not need to be located on a grid or any specific configuration. Instead any location from grid to unique fixed locations to organic placement (simulate light through tree branches) could be chosen, and the recorded lighting data can be preprocessed or transformed for uses with the existing luminaires and in area lighting systems.

Other options for processing illumination data include temporal filtering or insertion. For example, actual illumination data can be averaged to minimize the effects of fleeting phenomenon such as clouds, sunrise, sunset, or the flickering of a flame. Alternatively, such temporary phenomenon may appear at choreographed times or be randomly inserted over a base lighting pattern representing more constant lighting such as light from a blue sky or the orange or blue body of a flame.

An author, as noted above, may alter recorded illumination data to create lighting that is pleasing artistically or achieves the author's intended effects. However, an author may alternatively create wholly new illumination data without reliance on any recorded lighting data. Similarly, a technician might also create illumination data to create a particular useful function or result such as optimizing the response of a biological system to lighting.

Luminaire 200 of FIG. 2 or playback system 450 in FIG. 4 may include data storage or ports for removable media such as optical disks or electronic memory that stores a variety of different lighting patterns. "Play lists" could thus be generated to allow a choice of scenes to illuminate a room or other area. For example, a version of "daylight" could be displayed any time as could candle light. However, specific lighting may be more appropriate at specific times, perhaps candle lighting at dinner time and apparent sun light at others. Lighting systems could create a sunrise on the "east" ceiling transitioning through the day to sunset on the "west" ceiling. The "north" sky and "south" sky could also be represented on any part the ceiling or wall that was desired, and events such as lightning strikes and northern lights could be added for entertainment as well as useful illumination. In addition to functional or entertaining illumination, research sequences such as circadian rhythm studies could be created and included in a play list of the lighting system. Such play lists could be made available to others with similar interests and may be commercially marketed in the same manner music CDs, video disks, and MP3s and other digital entertainment available over the Internet.

Figure 6:
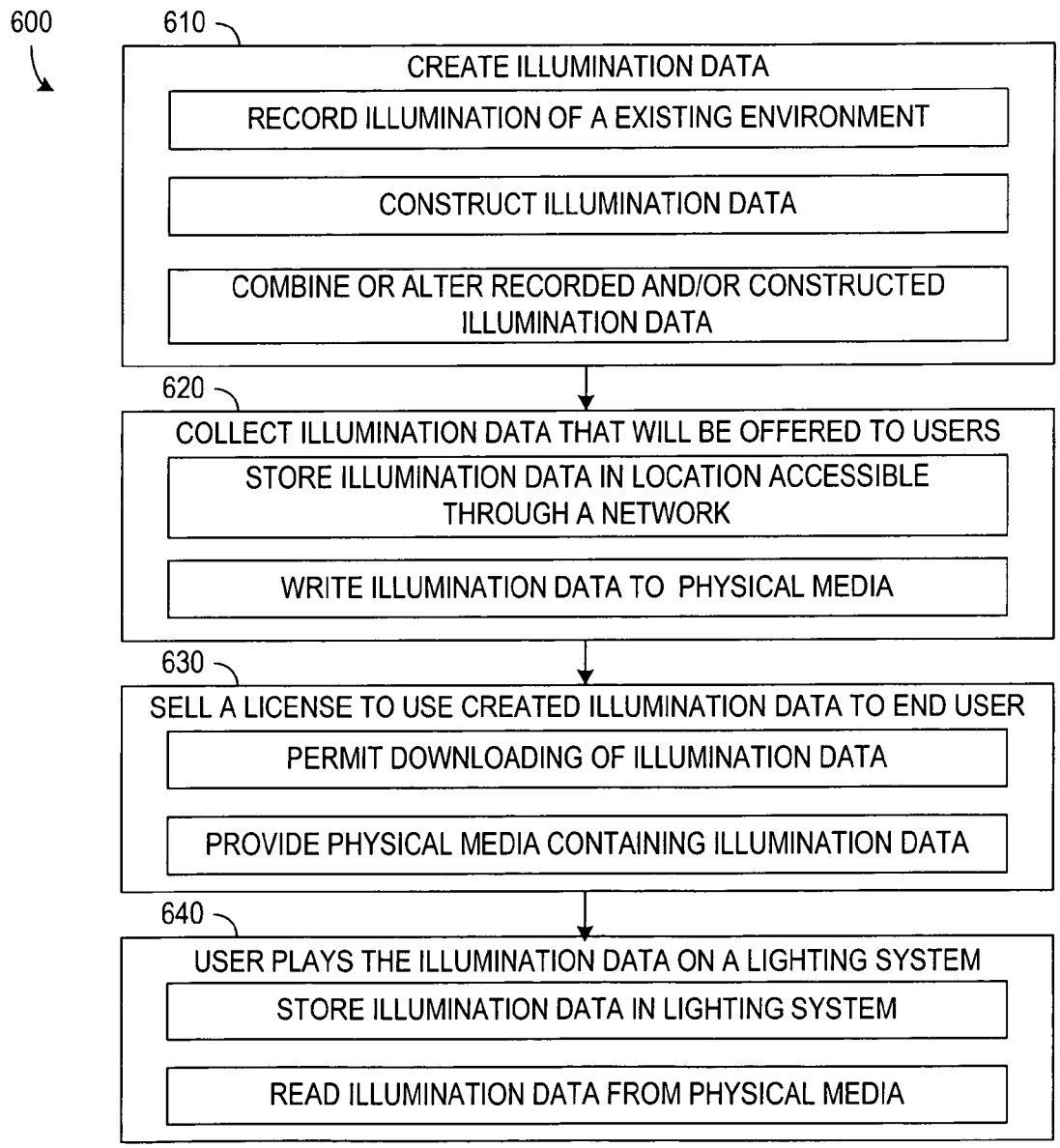
FIG. 6 is a flow diagram illustrating a business method for selling illumination data in accordance with an embodiment of the invention.

Illumination data files that are useful and in desirable formats will in general require skill to create in a similar manner to creating music. Accordingly, illumination data could be subject to legal protection as a work of authorship and may be licensed or transferred commercially. FIG. 6 is a flow diagram of a business method 600 employing the legal features of authored illumination data. The business method 600 starts with a step 610 of creating of the illumination data. The illumination data can be created using the techniques described above including recording illumination data from an environment, constructing illumination data from scratch, and combining or altering illumination data from either source. Step 620 then collects and stores illumination data that is being offered to users. For example, the illumination data can be stored in a central location such as a web site or could be stored on physical media CD-ROM or DVD-ROM. A fee for a license can then be charged as in step 620 for a user to download the illumination data via a network such as the Internet or as part of a purchase of physical media. The user can then use the illumination data in a lighting system as indicated in step 640.

Since lighting systems and each luminaire will generally have different sets of capabilities such as colors and power levels at each color, illumination data can be altered before sale to create a custom file that plays back correctly on the lighting system for which the file was intended. The alteration process can use measured characteristics of the luminaires that are recorded at the factory, and stored in the lighting system or cataloged by the serial numbers of the lighting systems. Software can in a reasonably straight forward manner convert a standardized illumination data file into a custom file (or files) to correctly playback a desired illumination. The necessary customization could be done automatically at download time by entering the serial number of the luminaire(s). Alternatively, luminaires can incorporate the necessary programs and processing power to convert a standardized illumination data file into the illumination data needed for the specific characteristics of the luminaire. Another approach would be to make each luminaire behave in a consistent manner, so that standard illumination data files could be used without alteration.

A complete set of tools to record, create, and playback illumination scenes as described above can be analogous to tools now available for entertainment industries such as the music, TV, and motion picture industries. However, the manipulations and final uses of the systems described are not limited to entertainment or human consumption. For example, in agriculture where artificial light is used, it may be desirable (to save energy) to remove the portion of the spectrum that is normally reflected by the plant (green leaf spectrum) and wasted from a biological process point of view. In industrial process control, machine vision systems could benefit from custom spectral lighting to increase speed and accuracy of the recognition system. Businesses manufacturing colored materials (e.g., paints, dyes, plastics, and textiles) could also benefit from repeatable, custom spectral lighting to improve quality and consistency of their products.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A process comprising:
   producing first illumination data that represents a first spectral distribution; and
   operating a first light source containing a plurality of emitters so that respective intensities of light from the emitters are determined from the first illumination data and a combination of the respective intensities of the emitters produces the first spectral distribution, wherein the first spectral distribution changes over time, and operating the first light source comprises changing the respective intensities of the light in the spectral distribution over time.

2. The process of claim 1, wherein the changes in the first spectral distribution over time are timed according to a sleep cycle of a user.

3. A process comprising:
   producing first illumination data that represents a first spectral distribution, wherein producing the illumination data comprises measuring and recording a spectral distribution of light in a first environment; and operating a first light source containing a plurality of emitters so that respective intensities of light from the emitters are determined from the first illumination data and a combination of the respective intensities of the emitters produces the first spectral distribution.

4. The process of claim 3, wherein the first environment comprises a source of light that is selected from a group consisting of the sun, the moon, an incandescent light, a gas flame, a candle, an oil lamp, a kerosene lantern, a limelight, a black light, a bug light, an antibug light, a film-safe light, an arc-lamp, and any colored light.

5. The process of claim 3, wherein producing the illumination data further comprises:
measuring and recording a spectral distribution of a second environment; and
combining data from the recording of the spectral distribution of the first environment with data from the recording of the spectral distribution of the second environment to create the first illumination data.

6. A process comprising:
producing a plurality of illumination data files that respectively represent different spectral distribution;
providing a set of the illumination data files to a player that controls operation of a first light source containing a plurality of emitters;
selecting one of the illumination data files from the set; and
operating the first light source so that respective intensities of light from the emitters depend on the illumination data file selected and so that a combination of the respective intensities of the emitters produces the spectral distribution represented by the illumination data file selected.

7. The process of claim 6, wherein:
a first of the illumination data files represents a first spectral distribution that corresponds to a maximum useful brightness that the first light source can produce at a first level of energy consumption; and
a second of the illumination data files represents a second spectral distribution that differs in shape from the first spectral distribution and corresponds to a maximum useful brightness that the first light source can produce at a second level of energy consumption.

8. The process of claim 6, wherein one of the illumination data files represents a spectral distribution that corresponds to a filter effect on a light source.

9. The process of claim 6, wherein one of the illumination data files represents a spectral distribution that corresponds to an optimal energy efficiency of the first light source.

10. The process of claim 6, wherein one of the illumination data files represents a spectral distribution that is selected to optimize a response of a biological system.

11. The process of claim 10, wherein the response is growth of a plant or organism.

12. The process of claim 6, wherein each of the illumination data files represents a spectral distribution corresponding to optimal energy efficiency of the first light source at a total lighting intensity that corresponds to that illumination data file.

13. The process of claim 12, further comprising changing the selected illumination data file with changes in a brightness level of the first light source.

14. The process of claim 6, wherein the first light source produces light at a frequency sensed by ganglion cells in a human eye.

15. The process of claim 6, wherein the first spectral distribution covers a range including a light wavelength of about 350 nm.

16. The process of claim 6, wherein the first spectral distribution covers a range including a light wavelength of about 750 nm.

17. A process comprising:
producing first illumination data that represents a first spectral distribution; and
operating a first light source containing a plurality of emitters so that respective intensities of light from the emitters are determined from the first illumination data and a combination of the respective intensities of the emitters produces the first spectral distribution, wherein operating the light source comprises controlling respective magnitudes and on-times of drive currents for the emitters.

18. The process of claim 17, wherein the plurality of emitters comprises at least five emitters, wherein each of the emitters has an emission spectrum that differs from the emission spectra of the other emitters.

19. The process of claim 17, wherein each of the emitters comprises a light emitting diode.

20. A process comprising:
producing first illumination data that represents a first spectral distribution, wherein the first illumination data represents a spatial distribution for the first spectral distribution;
operating a first light source containing a plurality of emitters so that respective intensities of light from the emitters are determined from the first illumination data; and
operating a second light source that is spatially separated from the first light source so that a combination of light from the first and second light sources produces the first spatial distribution.

21. The process of claim 20, further comprising varying spectral outputs of the first and second light sources to simulate lighting from the sun.

22. The process of claim 20, wherein producing the illumination data comprises:
measuring and recording light incident from a first direction in an environment; and
measuring and recording light incident from a second direction in the environment, wherein the spatial distribution represented by the illumination data includes the light from the first and second directions.

23. The process of claim 22, wherein operating the first and second light sources comprises operating the first and second lighting systems in a network under control of a player system that provides the illumination data.

24. A process comprising:
producing first illumination data that represents a first spectral distribution; and
operating a first light source containing a plurality of emitters so that respective intensities of light from the emitters are determined from the first illumination data and a combination of the respective intensities of the emitters produces the first spectral distribution, wherein operating the first light source comprises performing a combination of pulse width modulation and amplitude modulation on drive signals respectively applied to the emitters to control average illuminations respectively from the emitters.

25. The process of claim 24, further comprising controlling one of the pulse width modulation and the amplitude modulation for at least one of the emitters to transmit data.

* * * * *